Jan. 1, 1935.   F. FENTON   1,986,629
METHOD OF MAKING CONTOURED RUBBER ARTICLES
Filed April 20, 1934
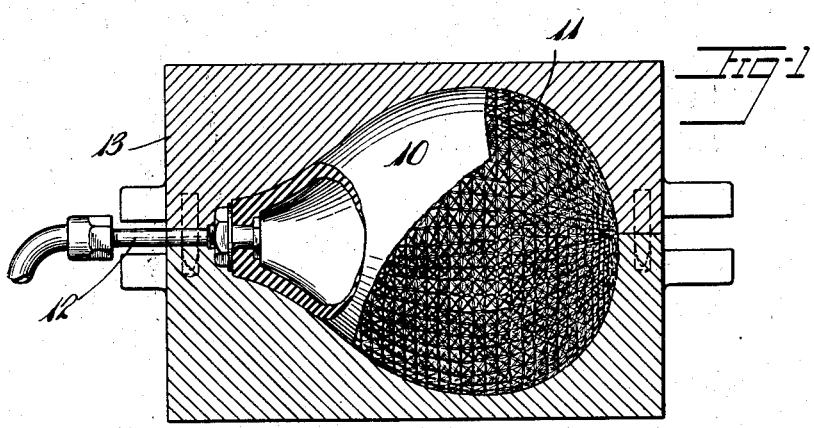
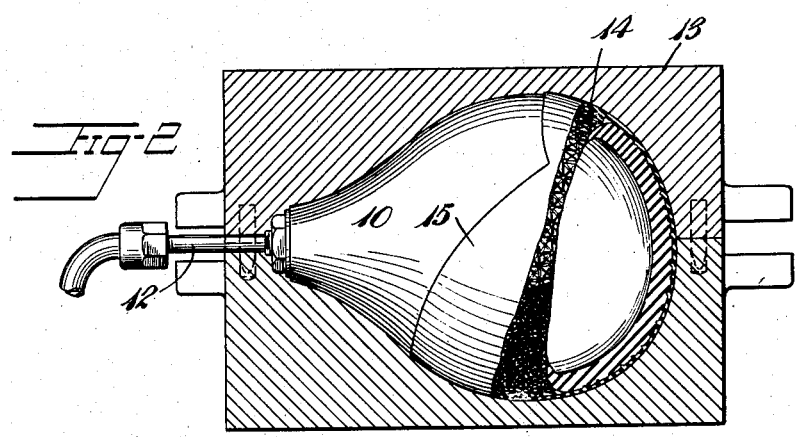
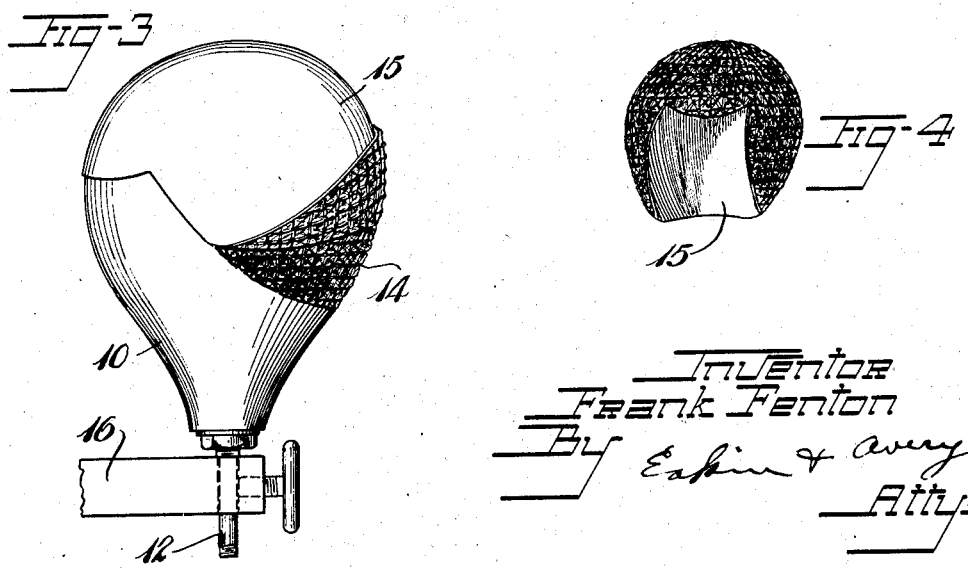
Inventor
Frank Fenton
By Eakin & Avery
Attys.

Patented Jan. 1, 1935

1,986,629

UNITED STATES PATENT OFFICE 1,986,629

METHOD OF MAKING CONTOURED RUBBER ARTICLES

Frank Fenton, Akron, Ohio, assignor to The B. F. Goodrich Company, New York, N. Y., a corporation of New York Application April 20, 1934, Serial No. 721,483

7 Claims. (Cl. 18—56)

This invention relates to the manufacture of contoured rubber articles, such for example as bathing caps and shoes. This invention is an improvement upon the subject matter of the copending application of V. H. Bodle and E. B. Newton, Serial No. 598,418, filed March 12, 1932, for Method of making a rubber article having a molded outer surface; the copending application of A. A. Glidden, Serial No. 603812, filed April 7, 1932, for Molded rubber article and process of making the same; and the copending application of L. H. L'Hollier, Serial No. 604909, filed April 13, 1932, for Molded rubber article and method of making the same.

The chief objects of the invention are to provide improved procedure for producing such articles, and to provide for producing reproductions of the surface designs of chosen materials in the articles with accuracy of reproduction and to provide for economy and convenience of procedure.

These and further objects will be apparent from the following description, reference being had to the accompanying drawing, in which:

Fig. 1 is a cross section of a mold assembly including an expansible matrix in the course of formation according to the preferred procedure of the invention.

Fig. 2 is a view like Fig. 1 but showing the expansible matrix utilized in the formation of a rubber article according to the invention.

Fig. 3 is an elevation of the expansible matrix with a molded article upon and partly removed from it.

Fig. 4 is a view of the completed article.

For the purpose of illustration a rubber bathing cap is chosen, such cap being molded to the hollow form of Fig. 4 and having molded in its outer surface a reproduction of the surface of knitted fabric.

An expansible core 10 is formed of unvulcanized rubber to the approximate pear shape shown, and, while it is still unvulcanized, or only partially vulcanized, so that its surface is yet plastic, a fabric cap-like sheath 11 is mounted upon it with the surface of the sheath chosen for reproduction applied in contact with the rubber. A suitable connection 12 is provided for admitting pressure fluid within the expansible core. The core with the fabric sheath upon it is placed in the cavity of a sectional mold 13 and when the mold has been closed, pressure fluid, preferably heated, is admitted to the interior of the core to expand it and the fabric sheath against the mold wall. The surface of the rubber thereupon becomes molded with a negative impression 14 of the fabric surface, and the rubber preferably is vulcanized while it is thus held in the mold to make the impression permanent.

By the expansion of the fabric sheath slackness is removed from it so that its weave is made more uniform and a neat impression is imparted to the rubber surface. The mold is then opened and the fabric 11 is removed from the core 10, which now constitutes an expansible negative matrix. A layer 15 of unvulcanized rubber is then molded upon the matrix, this being effected by expanding the matrix against the rubber layer in the mold cavity to mold the inner surface of the rubber layer to a positive reproduction of the original fabric surface and at the same time to mold the layer to the desired cap shape against the wall of the cavity.

The matrix and cap are then removed from the mold and the cap is stripped from the matrix as shown in Fig. 3 and turned inside out to present its matrix molded surface as its outer face as shown in Fig. 4. To facilitate the stripping operation the matrix may be clamped to a support 16 (Fig. 3).

Preferably the cap is vulcanized while it is in the mold, although, if desired, the vulcanization may be effected in open heat after the cap has been removed from the mold either with or without the use of a shaping support. If desired, a lubricant may be provided on the face of the matrix to prevent adhesion of the rubber to it, but this is not necessary in all cases.

I claim:

1. The method of making a contoured rubber article which comprises providing an expansible body having an outer matrix surface, and distending said body against a layer of rubber to mold the latter against the said matrix surface.

2. The method of making a contoured rubber article which comprises forming an expansible matrix body having a convex outer surface of plastic material, distending said surface against the surface of an article the surface design of which it is desired to reproduce in rubber to mold said convex surface to a negative reproduction of said design, and molding a layer of rubber against said negative matrix to provide in the surface of said layer a positive reproduction of said design.

3. A method as defined in claim 2 in which the matrix surface of the said expansible body is of rubber and it is vulcanized prior to the step of molding the said layer of rubber against it.

4. The method of making a contoured rubber article which comprises forming an expansible matrix body having a convex outer surface of plastic material, distending said surface against a flexible sheet material, the surface design of which it is desired to reproduce in rubber, to mold said convex surface to a negative reproduction of said design, and distending the matrix against a layer of rubber to provide in the surface of the latter a molded reproduction of said design.

5. The method of making a contoured rubber article which comprises providing an expansible body with an outer surface of plastic matrix material, mounting thereupon in contoured form a flexible sheet material, the inner surface design of which it is desired to reproduce in rubber, distending the expansible body to mold its outer surface against the flexible material, removing the flexible material, molding a layer of rubber against the matrix surface of the body, removing the layer of rubber and turning it inside out to present its matrix molded surface as an outer surface of the body.

6. The method of making a contoured rubber article having as a surface design a reproduction of the surface design of a chosen article which comprises, by molding a layer of rubber against the surface of the chosen article and removing it, providing a flexible contoured matrix body having a negative matrix of the design at its outer surface, and by flexure of the matrix body shaping it against a layer of rubber to mold the latter against the outer contoured matrix surface of the body.

7. A method as defined in claim 6 in which the flexible matrix body is made hollow and is shaped against the said rubber layer to effect the molding of the latter by pressure fluid within the matrix body.

FRANK FENTON.